United States Patent [19]

Micznik et al.

[11] Patent Number: 4,779,090

[45] Date of Patent: Oct. 18, 1988

[54] ELECTRONIC SECURITY SYSTEM WITH TWO-WAY COMMUNICATION BETWEEN LOCK AND KEY

[76] Inventors: Isaiah B. Micznik, 30515 W. 14 Mile Rd., #43, Farmington Hills, Mich. 48018; David A. Tenenbaum, 24351 Jerome, Oak Park, Mich. 48237; Jeffrey Tenenbaum, 28477 Franklin Rd., Southfield, Mich. 48034

[21] Appl. No.: 893,648

[22] Filed: Aug. 6, 1986

[51] Int. Cl.$^4$ .............................................. H04Q 1/00

[52] U.S. Cl. ................................ 340/825.31; 70/278; 340/825.34; 340/825.69; 340/825.72

[58] Field of Search .................. 361/172; 70/256, 278; 380/3; 235/382, 382.5; 340/572, 825.3, 825.31, 825.34, 825.32, 825.64, 825.72

[56] References Cited

U.S. PATENT DOCUMENTS

| | | | |
|---|---|---|---|
| 3,196,440 | 7/1965 | Weinstein | 340/825.72 X |
| 3,622,991 | 11/1971 | Lehrer . | |
| 3,761,892 | 9/1973 | Bosnyak et al. . | |
| 3,794,848 | 2/1974 | Peters et al. . | |
| 3,891,980 | 6/1975 | Lewis et al. | 340/825.31 X |
| 3,925,763 | 12/1975 | Wadhwani et al. . | |
| 4,072,898 | 2/1978 | Hellman et al. | 340/825.69 X |
| 4,206,491 | 6/1980 | Ligman et al. . | |
| 4,209,782 | 6/1980 | Donath et al. . | |
| 4,242,663 | 12/1980 | Slobodin . | |
| 4,250,533 | 2/1981 | Nelson | 70/278 X |
| 4,353,064 | 10/1982 | Stamm | 235/382 X |
| 4,385,296 | 5/1983 | Tsubaki et al. . | |
| 4,396,914 | 8/1983 | Aston . | |
| 4,453,161 | 6/1984 | Lemelson . | |
| 4,473,825 | 9/1984 | Walton | 340/825.34 X |
| 4,509,092 | 4/1985 | Invernizzi | 361/172 |
| 4,509,093 | 4/1985 | Stellberger . | |
| 4,559,529 | 12/1985 | Bernhardt . | |

*Primary Examiner*—Ulysses Weldon

*Attorney, Agent, or Firm*—Krass & Young

[57] ABSTRACT

An electronic security system having a locked and at least one unlocked state and comprising at least one electronic access controller and at least one electronic key. The electronic security system employs a predetermined, distinctive, first code stored in memories in each access controller and key, and each electronic key stores a predetermined second code consisting of a number part and an associated time delay part. The number parts of all second codes are also stored in the access controller memory.

17 Claims, 6 Drawing Sheets

ELECTRONIC SECURITY SYSTEM WITH TWO-WAY COMMUNICATION BETWEEN LOCK AND KEY

FIELD OF THE INVENTION

The present invention relates to a security system for controlling access to an area or system and, more particularly, to a security system comprising one or more access controllers and one or more associated electronic keys wherein an access controller can transmit a distinctive code and the properly associated electronic keys respond by transmitting distinct codes to be received by the access controller to verify authorization.

BACKGROUND OF THE INVENTION

Because electronics can implement complex functions relatively easily, security systems with electronic locks and keys can provide the high degree of security required in many situations. For example, as in the electronic code controlled deadbolt disclosed by Kristy in U.S. Pat. No. 4,568,998, a radio transmitter can selectively transmit coded "closed" or "open" signals. A receiver, including close and open decoder means and logic means separately responsive to these decoder means can produce outputs which actuate a switch to control a motor. The motor drives the deadbolt between the closed and open positions.

In the security system disclosed by Bosnyak, et al, in U.S. Pat. No. 3,761,892, permutations of a number system are used to create addresses for read-only memories (ROMs). A paired electronic lock and key each contain identical copies of such a ROM. The address code is transmitted from the lock to the key and, in response, the contents of the addressed location of the ROM are retransmitted from the key back to the lock. An identical comparison of the transmission received by the lock with the addressed contents of the lock's ROM signifies that a key associated with that electronic lock is requesting access to the area secured by the electronic lock.

Hardware-based systems such as those discussed above are relatively easily defeated, either by recording the signals exchanged by the lock and key to dissect the code or by copying the read-only memory.

On a more sophisticated level, security systems can be designed to generate a new key code whenever desired. For example, as disclosed by Donath et al., in U.S. Pat. No. 4,209,782, a "central" key can be used to generate a random number which is stored in a memory in the electronic lock and transferred to an electronic key, which uses the number as the next-used security code.

Stellberger, in U.S. Pat. No. 4,509,093, discloses a security system whose electronic lock, upon excitation by a signal received from the electronic key, creates a random number which is transmitted back to the electronic key. This number is transmitted to the key and subjected to the same two-step computational process in both key and lock. The computational result from the key is transmitted back to the lock, wherein it is compared with the results of the computations in the electronic lock itself. If the two results are identical, an actuation pulse is transmitted to unlock the gate being secured. Otherwise, the gate remains locked.

Stamm, in U.S. Pat. No. 4,353,064 discloses an access control card for use with a remote card reader. The card reader transmits coded radio frequency signals, the transmitted code being compared to a code stored in a memory of each operating card that receives the signals. If the received and stored codes are identical, the card transmits a signal coded with a second code stored in the card's memory. If the card reader recognizes the transmitted second code, access is given by the card reader. However, no provision is made in Stamm's card for different second code numbers to be used by separate cards. This feature is necessary where it is desirable to allow differing levels of access to different cards. Furthermore, all cards receiving the signal transmitted by the card reader will retransmit their responses at the same time. The resulting confusion of responses can lead to inaction or faulty operation by the card reader.

The problem of overlapping responses from a number of tags is approached by Barrett, Jr., et al, in U.S. Pat. No. 4,471,345. This patent discloses a portal communication system for monitoring the passage of tags past a portal location. The identification tags generate responses to an interrogation signal sent by the portal. These responses are randomly delayed in order to reduce the probability that two response signals overlap. However, the system disclosed requires that each tag must have a distinct identifying code. This complicates the processing required if the task at hand is to monitor tags worn by persons who are members of broad categories that are to be monitored (e.g., doctors, or nurses, in a hospital).

For increased security and to allow a variety of levels of access, it would be advantageous to have a security system with one or more access controllers and one or more associated electronic keys, each access controller having a predetermined, possibly unique, controller code and each electronic lock having its own, possibly unique, key code. In addition, such a security system will have improved performance if each key is given its own response time delay. It would further be advantageous for the security system to encipher the transmitted signals with random numbers, in order to provide even greater security. Finally, it would be advantageous to have a security system whose electronic keys conserve electrical power.

SUMMARY OF THE INVENTION

The present invention is a highly secure security system having one or more electronic keys able to operate one or more access controllers. Each access controller has a predetermined identifying code and each key unit has a identifying key code. In addition, each access controller (or electronic lock) has a memory storing an access controller code and a part of each of the distinct lock codes, while each key has a memory storing an access controller code and that key's own code.

In a preferred embodiment of the invention, the sequence of operations which causes an access controller to change to one of the available unlocked states is initiated when a key unit intercepts an uncoded signal transmitted by the access controller. This first signal causes the key to be ready to receive a second signal from the access controller. Immediately after transmitting the first signal, the access controller transmits the second signal, which is coded with the controller's identifying code number.

The coded signal is demodulated and deciphered to produce an identifying code number. A portion of the identifying code number is compared to a portion of the code number stored in each receiving key's memory to determine whether that electronic key is associated with the transmitting access controller. If they are not associated, the electronic key takes no further action. If, however, they are associated, the key uses its own key code number, stored in the key's memory, to produce a coded response signal. Upon receipt of the response signal, the access controller demodulates the response signal and compares the key code number to a list stored in the access controller memory. If the key code numbers and a number on the list are identical, access to the secured area or system is allowed. Otherwise, access is denied.

The electronic keys can compare a portion of the modulating codes with a portion of the stored first code. Comparison of portions of the modulating codes and the stored first code allows the security system to have "master" keys that can gain access to the area or system protected by the security system.

The second codes can comprise distinct number and distinct time delay parts associated with each of the electronic keys, the transmitter in each electronic key being adapted to transmit the signal modulated by the number part of the distinct one of the second codes and delayed from the time of receiving signals modulated by codes by the time delay part of the distinct one of the second codes, and the first cmparison means is further adapted to compare the number part of each of the first signals to the number part of the distinct second codes. The first transmitter of the electronic lock can be adapted to transmit an unmodulated activation signal, and each electronic key can further comprise a passive trigger, responsive to the unmodulated signal transmitted by the first transmitter, the passive trigger connected to a power switch for activating the memory, the second receiver, the second comparison means, and the transmitter of each electronic key. The signals can be modulated by amplitude modulation.

The first and second comparison means can be programmed microprocessors, and the microprocessors can be adapted to produce random numbers which are individually combined with the first and second codes to produce third and fourth codes which can be deciphered into the random number and first code, and random number and second code, respectively.

DETAILED DESCRIPTION OF THE PREFERRED EMBODIMENTS

Figure 1:
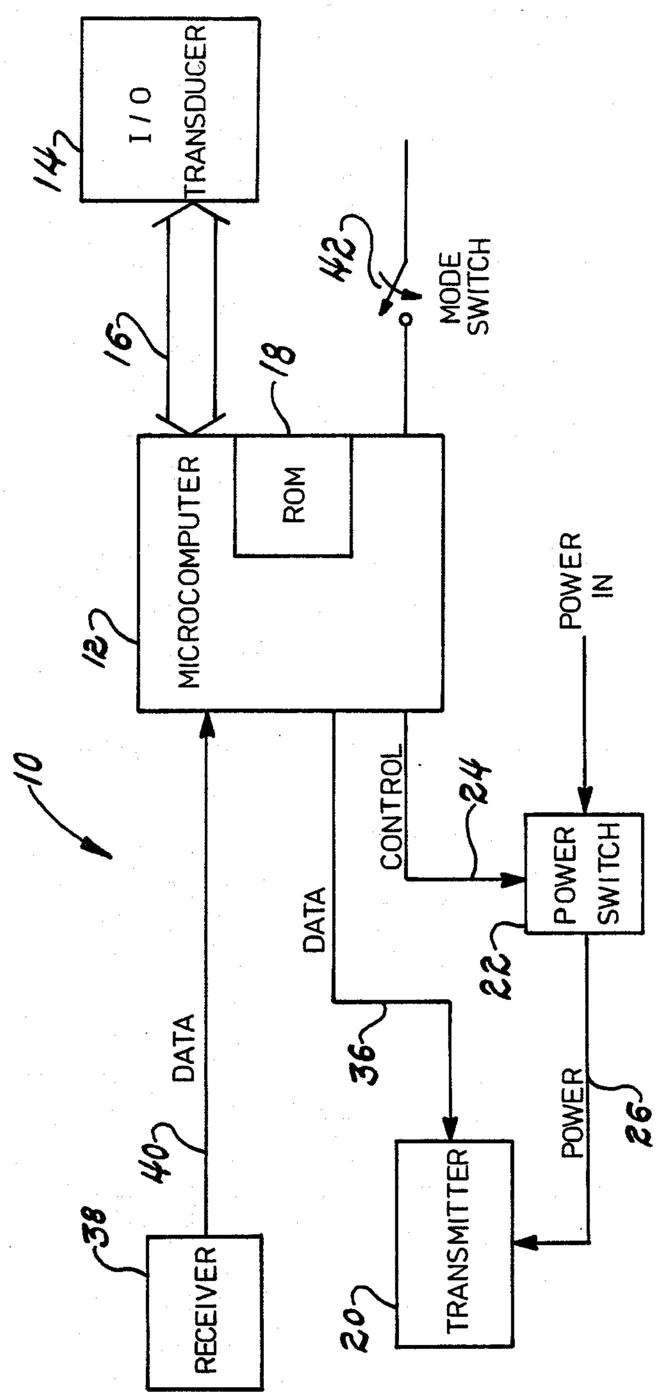
FIG. 1 of the drawings is a block diagram of the electronic lock of the present electronic security system.

FIG. 1 of the drawings is a block diagram of the circuitry of a preferred embodiment of an access controller 10 of the present security system invention. It is to be understood that the present security system can comprise more than one access controller 10. These access controllers are located at every entry point of an area or system to be protected.

For example, the area to be protected can be the individual suites in an office building, each suite having at least one door. Access to the suites in the building follows a hierarchy. Highest priority in the hierarchy will be accorded to a "master" key to be carried by persons needing access to all suites in the building, such as janitorial personnel. Lower levels of hierarchy might include, for example, keys that give access to a limited number of suites in the building, such as all suites occupied by a particular company. Some suites may have more than one door. Accordingly, both doors to such a suite will be given the same access code. Finally, each door may have more than one "open" state. For example, persons requiring frequent access to a given door or persons who are maneuvering large objects through such doors can be given keys which allow the door to remain unlocked for a relatively long period of time, whereas persons needing only occasional or transient access through a door may be given only a relatively short "open" period of time.

Another example of a security system according to the present invention is one which protects or limits access to a telephone. In this case, a single access controller 10 can be attached or built into the telephone, the access controller limiting access to the telephone to those persons having appropriately coded electronic keys. A hierarchy of access levels can allow some persons to be given complete access to the telephone, whereas other persons may be limited to make telephone calls only to local points. Further, some persons may be restricted to use only specific telephones, while other persons may use any protected telephone.

Other points of entry with which the present security system can be used include cash registers, cathode ray tubes (or other computer terminal devices), time clocks, garage door openers, and industrial equipment. If the security system is used with a computer terminal, a hierarchy of access levels can be used to restrict the access of a particular terminal user to a predetermined set of computer programs.

Microcomputer 12 is connected to input/output transducer 14 by a data bus 16. An input/output (I/O) transducer 14, such as a relay, solenoid, or other electrical switch, causes a locking mechanism to switch between locked and unlocked states, thereby denying or giving access to the protected area or system. Transducer 14 therefore controls the access secured by the present electronic security system. I/O transducer 14 also generates electrical signals, indicative of current locked/unlocked state, these signals being received by microcomputer 12 over bidirectional data bus 16. These signals can, for example, be used to cause the security system to enter the locked state a predetermined period of time after it has been used to gain access.

Microcomputer 12 can contain a read-only memory (ROM) 18 which contains a computer program to be executed by microcomputer 12, as well as data associated with the computer program. Although ROM 18 is shown to be a part of the circuit of microprocessor 12, those skilled in the art will appreciate that ROM 18 can also comprise a separate electronic circuit, thereby allowing an easy way of "reprogramming" microcomputer 12.

Microcomputer 12 is connected to a radio frequency (rf) transmitter 20 through power switch 22 by means of control line 24 and power line 26. Upon receipt of an appropriate control signal generated by microcomputer 12 on control line 24, power switch 22 permits the transmission of electrical power from a power source (not shown) to transmitter 20 on power line 26. Microprocessor 12 can generate the control signal on control line 24 in response to an input signal, such as may be generated by a user who steps on a floor switch, or presses a door switch, or takes some other direct action in the vicinity of the door. Alternatively, microprocessor 12 can be programmed to occasionally generate the control signal in an autonomic mode.

Transmitter 20 first transmits an unmodulated activation signal. This activation signal is relatively high powered and used only to trigger a passive tuned circuit in the electronic key. For the activation signals, the transmitted range is approximately 4 feet. The unmodulated activation signal is transmitted for 100 milliseconds, before transmitter 20 is used to transmit a coded signal which will be described subsequently.

As an alternative to having the passive tuned circuit in each electronic key, the receiver in each electronic key can periodically sample its frequency band to determine whether any actuation signals are present. For example, within every 500 millisecond interval, a clock in the electronic key can cause the receiver to sample its frequency band for 10 milliseconds. In this mode, battery power consumption is substantially reduced. By using the higher frequency band used for the coded communications, a lower transmitted power level can be used and the same range of operation can be attained. The range of operation can be extended beyond approximately four feet by increasing the transmitted power level.

To transmit the coded signal, control signals are sent on control line 24 to power switch 22 which, in turn, causes power to be applied to transmitter 20 over power bus 26. The data to be transmitted by transmitter 28 are composed by microcomputer 12 and passed over data line 36 to transmitter 20. They are transmitted as amplitude modulated signals. The data transmitted are described in greater detail in the following sections of this detailed description. Alternate forms of energy can be used to transmit either the activation or coded signals. For example, they could be transmitted as infrared (IR) or ultrasound signals. It may be advantageous to use different forms of energy or two different frequencies of the same energy to transmit the two signals. In this case, as will be obvious to those skilled in the art, two transmitters, both controlled by microprocessor 12, will be required.

Receiver 38, (for example, a low power superheterodyne receiver which can be tuned to either the 27 megahertz or 49 megahertz range) receives radio frequency data which are then transmitted over data line 40 to microcomputer 12. In a manner to be fully described in the following sections of this detailed description, microcomputer 12 uses the data received over data line 40 to generate numerical sequences which assure that electronic lock 10 has communicated with an associated electronic key.

Mode switch 42 causes microcomputer 12 to operate in one of two modes. In a first mode, microcomputer 12 will run a program that periodically causes transmitter 20 to transmit activation and coded signals and wait a predetermined period of time for a response before transmitting a subsequent signal pair. In the second mode, microcomputer 12 runs a program that will not cause these signals to be transmitted until the microcomputer has received an external trigger signal, such as a signal generated by a touch switch, doormat, interrupted light beam, voice activation, and so forth.

Microcomputer 12 can be a member of any number of a family of CMOS or $I^2L$ single chip microcomputers having enough single bit I/O lines to control the rest of the circuitry of electronic lock 10. Microcomputer 12 should also have enough on-chip ROM to contain the operating program and enough associated PROM to hold the system and access codes. On-chip ROM will make it exceedingly difficult to determine these system and key codes. Alternatively, the access codes can be stored in an off-chip memory.

Figure 2:
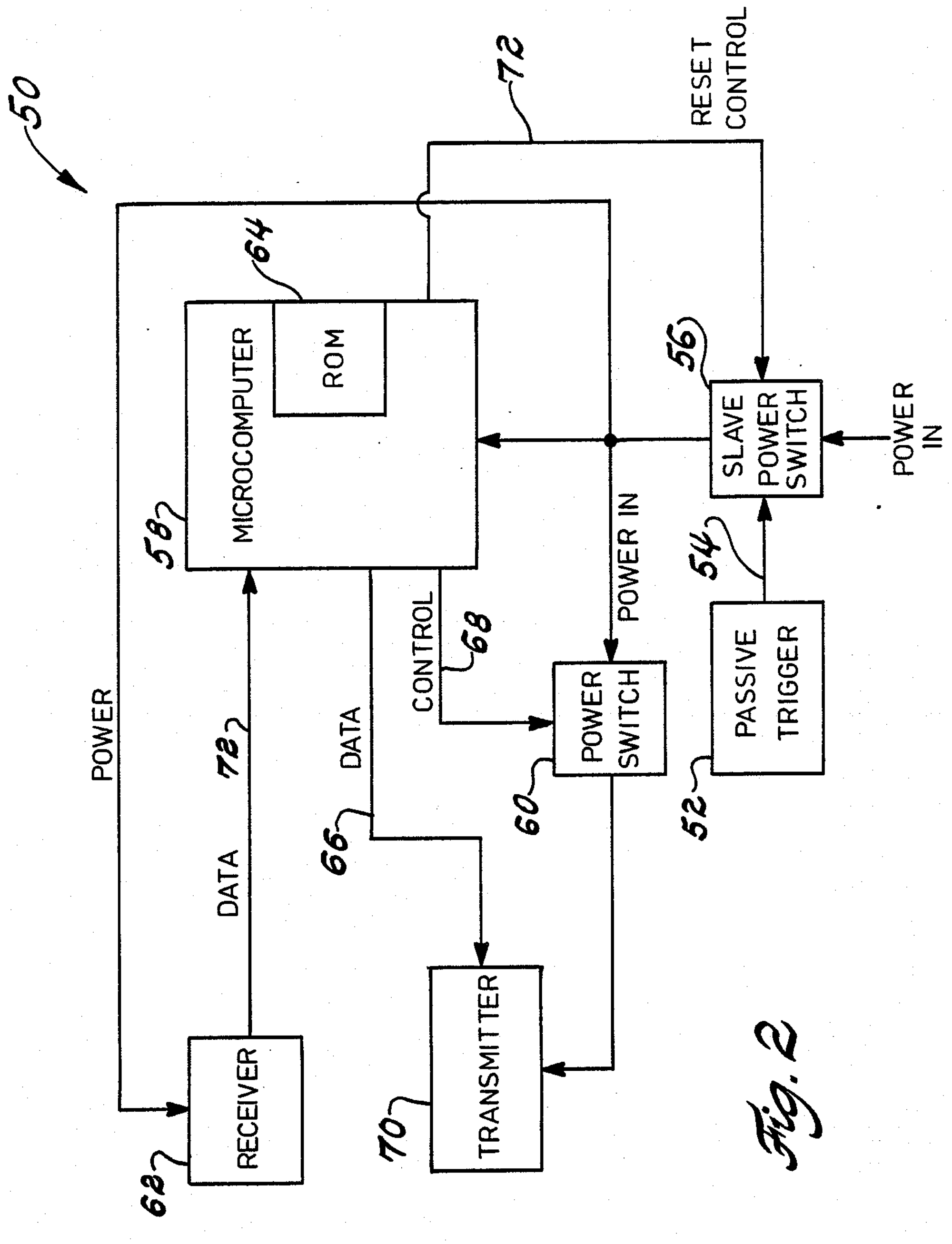
FIG. 2 is a block diagram of an individual electronic key of the present electronic security system.

Referring now to FIG. 2 of the drawings, a block diagram of the electronic circuitry of an electronic key 50 of the present security system is shown. Passive trigger 52, which can be a tuned circuit that is sensitive to a relatively high power, low frequency signal, such as that produced by rf transmitter 20, produces a trigger signal when it receives an appropriate rf activation signal. A trigger signal is transmitted over line 54 to power switch 56 which receives electrical power from a source such as a battery which is packaged with electronic key 50. In other configurations, the power provided to power switch 56 can be generated from the activation signals received from electronic lock 10, or may be received by direct electrical contact with electronic lock 10. In these latter two configurations, a battery is not needed by electronic key 50. Power switch 56 can be a D flip-flop (positive edge triggered) connected to the passive trigger. It transmits electrical power that is connected to microcomputer 58, power switch 60, and receiver 62.

Microcomputer 58 can be, although it need not be, the same as microcomputer 12 of electronic lock 10. It comprises ROM 64 which contains the computer program which it executes. ROM 64 can also contain authorization codes required by the electronic security system of the present invention, although these codes may be contained in external ROM, programmable ROM (PROM), erasable PROM (EPROM), or electrically erasable PROM (EEPROM). Microcomputer 58, in response to the program contained in ROM 64, generates data and control signals, sent on lines 66 and 68, respectively. Control signals on line 68 cause power switch 60 to transmit electrical power received from power switch 56 to be transmitted to answerback signal transmitter 70. This transmitter is a relatively low power, amplitude modulated transmitter operating at either 27 megahertz or 49 megahertz, whichever is the frequency used by receiver 38. This transmitter is supplied with electrical power only when it is needed to transmit data. The desired control is supplied by the control signal received over line 68. The data comprising the answerback signal will be described in greater detail subsequently in this detailed description.

Receiver 62, which receives its electrical power from power switch 56, is, as mentioned before, tuned to receive transmissions from the transmitter (the data signal transmitter) 20 of electronic lock 10. The received data are supplied as a demodulated code at logic levels compatible with the circuitry of microprocessor 58. These demodulated signals are received over line 72. After expiration of a predetermined time interval since electronic key 50 was activated, microcomputer 58 sends a reset control signal over line 74 to power switch 56. This signal causes power switch 56 to turn off, thereby deactivating circuitry of electronic switch 50 and saving electrical energy if a battery is used.

The keys' codes can be stored in their respective memories in at least two forms. In one form, a single number is used to provide both the key code and an associated delay. In the other form, the number has two parts, one giving the key code and the other the associated delay.

Figure 3A:
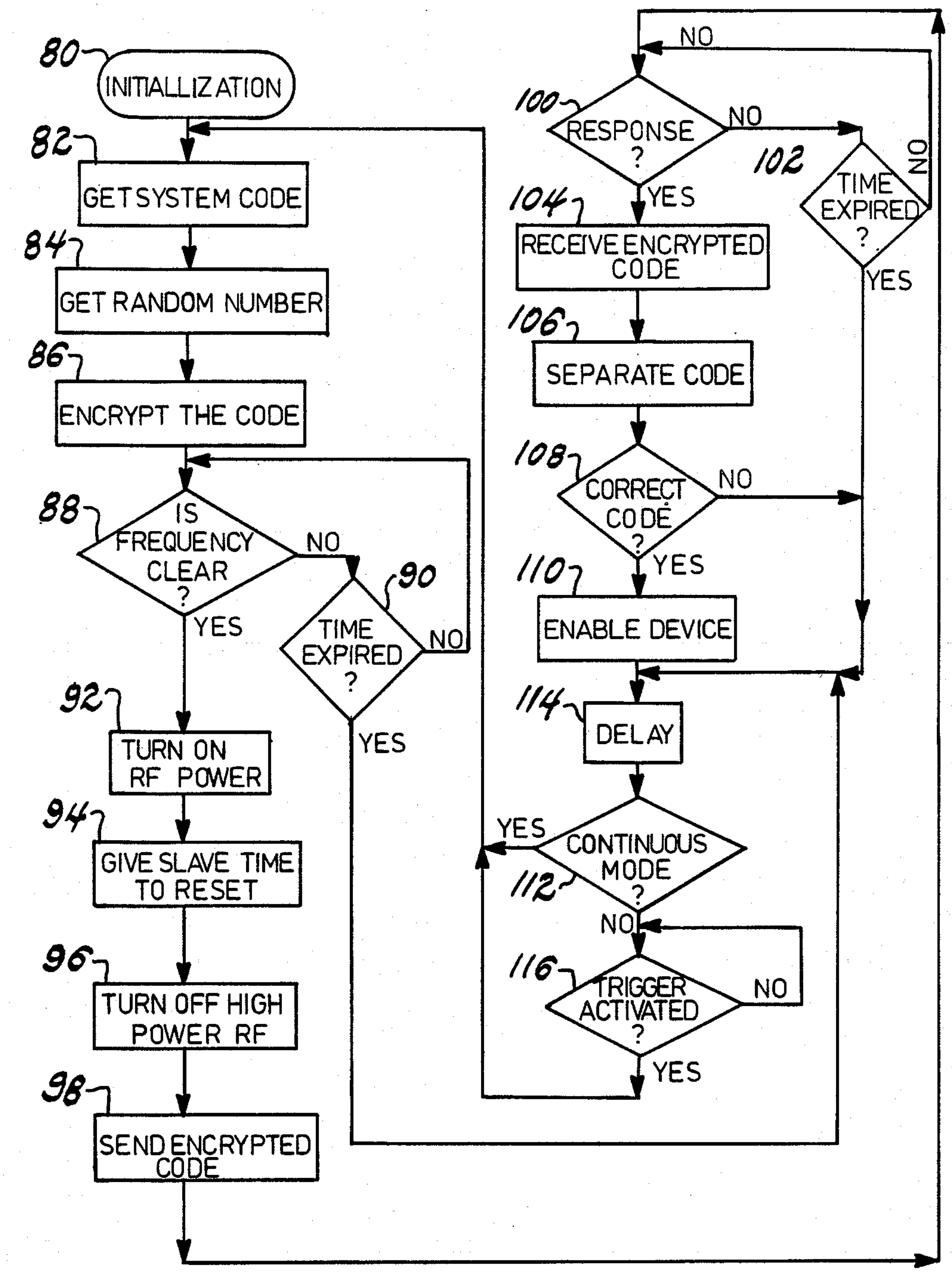
FIGS. 3A and 3B show flow charts of the computer programs followed by the electronic lock and the electronic key, respectively, of the present electronic security system.

Referring now to FIG. 3A of the drawings, which shows a flow chart of the computer programs used by electronic lock 10 and electronic key 50 of the present invention, the sequential operation of the present electronic security system will be explained. Upon activation of electronic lock 10, microcomputer 12 (see FIG. 1) is initialized as indicated in step 80. This initialization involves reading a computer program from ROM 18 into a random access memory (RAM) in microcomputer 12, properly configuring data registers, and properly configuring data input/output ports. Finally, in the initialization step 80, the activation signal is transmitted by rf transmitter 20 (see FIG. 1). In step 82 microcomputer 12 obtains the system code number from a ROM such as ROM 18. The microcomputer generates a random number as shown in step 84. The random number may be generated through any of a variety of techniques well-known to those skilled in the art and can be of any suitable number of digits. Encrypting the system code number and random number generated in the preceding two steps is accomplished in step 86. The result of this encryption is a number which should be decipherable in accordance with a predetermined computer algorithm which may be performed by microcomputer 12 of the electronic lock 10 or microcomputer 58 of the electronic key 50.

Figure 4A:
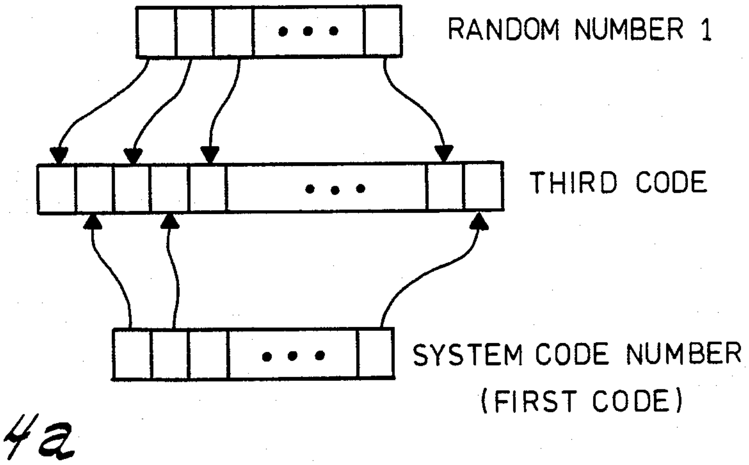
FIGS. 4A-4D show patterns by which to construct codes to be used by the access controller and/or the electronic key.
Figure 4B:
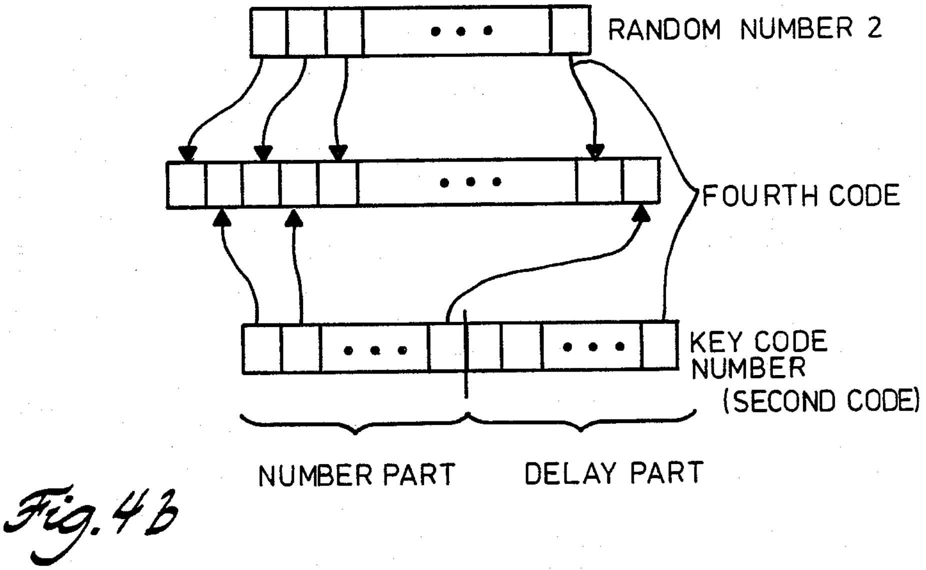
Figure 4C:
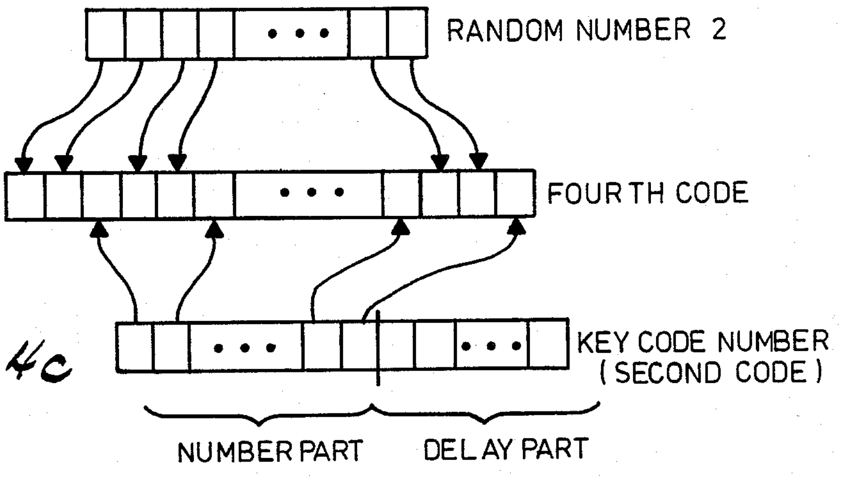
Figure 4D:
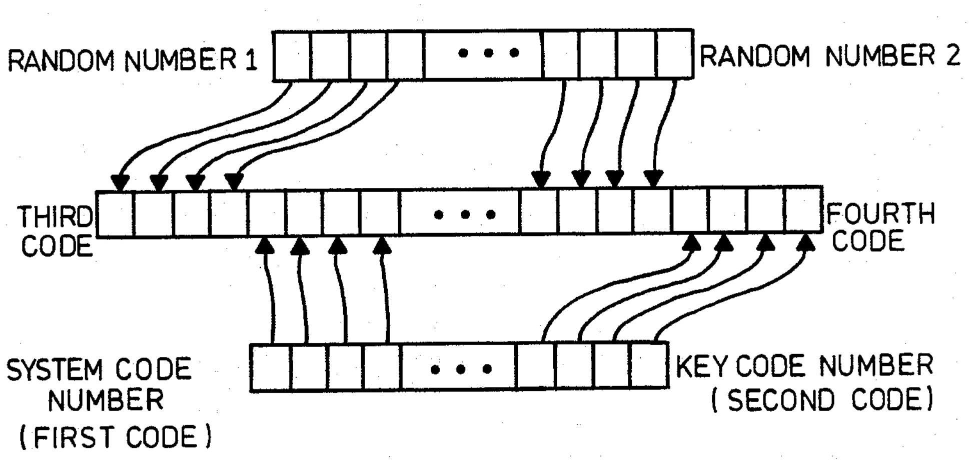

Such encryption can, for example, take either of the forms shown in FIGS. 4A or 4D. FIG. 4A shows an encoding by which an equal-length random number is mixed with the system code number—in this case, by simply alternately taking digits from the random number and the system code number. In FIG. 4D, digits are alternatively taken four at a time.

FIGS. 4B and 4C show ways to create the code to be transmitted by a particular electronic key. Analogously to FIG. 4A, the fourth code can be constructed by alternatively drawing digits from the random number and the number part of the key code number (FIG. 4B). Or, if the random number were to have twice as many digits as the number part of the key code numbers, two digits of the random number can be alternated with single digits of the number part of the key code number.

Microcomputer 12 of electronic lock 10 next prepares to transmit the encrypted code generated at box 86. By monitoring signals received by receiver 38 (in FIG. 1), microcomputer 12 determines, within a predetermined time interval (e.g., four seconds), whether the frequency channel used by transmitter 20 of the electronic lock is clear for at least 100 milliseconds. If the frequency channel is not clear, as designated by the "no" branch from box 88, microcomputer 12 checks to determine whether the predetermined time interval has expired, as shown in box 90. If the time interval has not expired, the microprocessor again checks the frequency channel to see whether it is clear. This process continues until either the time interval has expired or until the frequency channel is clear. If the time interval has expired, the program transfers to decision box 112, in preparation to begin another initialization step (box 80) to box 84 to generate another random number.

When microprocessor 12 determines that the frequency channel is clear, it turns on transmitter 20 (box 92). The computer program of microcomputer 12 then delays any further operation of the electronic lock for a predetermined interval of time adequate to allow the computer program of microcomputer 58 and the electronic key 50 to initialize and prepare to receive encrypted data. After the high powered RF activation signal has been transmitted for an adequate period of time to ensure that all electronic key units 50 within range have begun their initialization, transmitter 20 is turned off (box 96). The encrypted code produced in box 86 is then transmitted by transmitter 20 under control of microcomputer 12 (see FIG. 1), as indicated in box 98.

Microcomputer 12 next enters a time interval, waiting for a response from an electronic key 50. This is shown in decision boxes 100 and 102.

Assuming that a key unit responds before the waiting time interval expires, the encrypted code transmitted by electronic key 50 is received by receiver 38 and transmitted as demodulated data signals over line 40 to microcomputer 12 (see box 104). As indicated in box 106, the encrypted code is next deciphered to produce a random number and a key code number. Microcomputer 12 compares the key code number to the key code number deciphered from the encrypted code received from the electronic key. If these two key code numbers are equal, the electronic security system determines that an authorized electronic key has responded to the activation and data signals transmitted by transmitter 20. To provide an additional level of security, after the received and deciphered key codes are determined to be equal, unless a new random number is generated by microprocessor 58 (in FIG. 3*b*) and transmitted with the key code, the random number microcomputer 12 originally generated (in box 84) can be compared to the random number deciphered from the encrypted code received from the responding electronic key in box 106. (These comparison steps can be performed in the other order, as well). Accordingly, it enables I/O transducer 14 (see FIG. 1), as shown in box 110. The microprocessor program next moves to decision block 112, as it does if either of the code comparisons of decision block 108 fails or if the time expiration test of decision block 102 succeeds.

Block 114 represents a time delay of, say, three seconds, to complicate attempts by an unauthorized person to gain access to the system. In decision block 112, microcomputer 12 determines whether load switch 42 (in FIG. 1) is set to operate electronic lock 10 in a continuous mode. If the lock is operating in a continuous mode, the program returns to initiallization block 80. Otherwise, the program proceeds to decision block 116, where it tests to determine whether a trigger signal has been created. If no trigger signal is created, program waits at block 116 until such a trigger is received. When the trigger is received the program flow returns to initialization box 80.

Figure 3B:
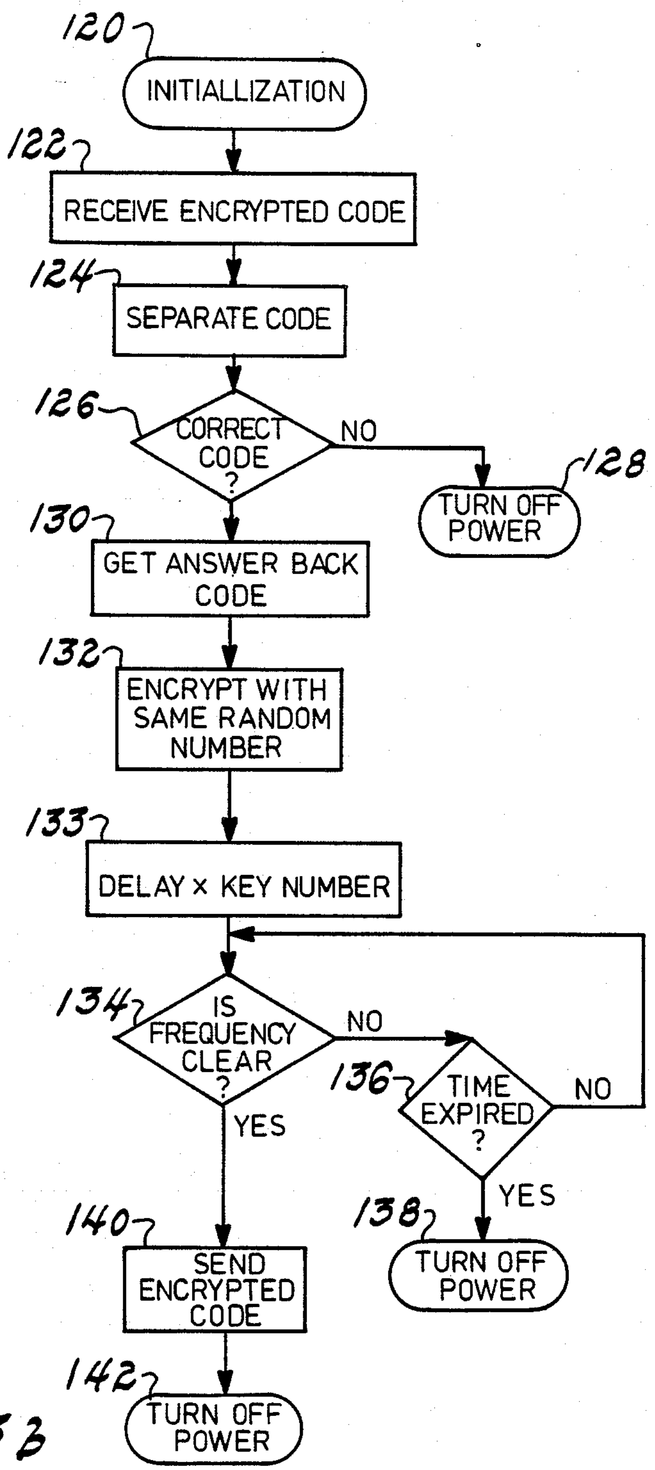

FIG. 3*b* shows the computer program performed by microcomputer 58 of electronic key 50, shown in FIG. 2. The steps shown in FIG. 3*b* occur between steps 92 and 96 of the flow chart shown in FIG. 3*a*. When an electronic key 50 receives a high powered RF signal transmitted by electronic lock 10 over signal transmitter 20, the key begins an initialization sequence shown in box 120. This initialization includes reading the computer program from a ROM, such as ROM 64, associated with microcomputer 58, into a RAM which is part of microcomputer 58, and also reading constants, such as the key code number into a RAM for use by microcomputer 58 (see FIG. 2).

Microcomputer 58 next causes power to be supplied to receiver 62 (in FIG. 2), which receives the encrypted code created in box 86 of FIG. 3*a* and transmitted at box 98 in FIG. 3*a*. This encrypted code, received, as indicated in box 122, is next deciphered, in box 124, according to the known algorithm, into the random number originally generated by electronic block 10 in block 84 and the system code number retrieved by microcomputer 12 in block 82 of FIG. 3*a*.

A portion (up to, and including the entirety) of the system code number is compared, in box 126, to a similar portion of the system code number stored in the RAM of electronic key 50. If these two system code number portions are different, the electronic key 50 has responded to a lock that the key is not authorized to access, and accordingly turns itself off (step 128). Otherwise microcomputer 58 retrieves key code number (in box 130) and encrypts this key code number with the random number deciphered in box 124 (box 132). Alternatively, microprocessor 58 can generate a new random number.

Microprocessor 58 causes a delay to occur before the electronic key responds. This delay is uniquely related to the number portion of the key code. It can be calculated by multiplying the number part of the key code by a predetermined time delay period or it can be determined by the delay part (if any) of the key code number. The delay is shown as box 133.

Following this delay period, microprocessor 58 determines whether the transmission frequency channel is clear for transmission of the number encrypted in step 132. This decision is made in blocks 134 and 136. For a predetermined period of time e.g., 4 seconds, the frequency channel of transmitter 70 (in FIG. 2) is monitored. If the time period expires before the frequency channel has become clear, electronic key unit 50 is turned off (box 138) by appropriate commands from microcomputer 58 over line 72 to power switch 56. If, however, the frequency channel becomes clear before the time period has expired, the encrypted code generated in box 132 is transmitted as an answerback signal over transmitter 70 (box 140). Following this transmission, as shown in box 142, microcomputer 58 sends instructions over line 72 to cause power switch 56 to cut electrical power to the electronics of electronic key 50. The channel is checked over a period of approximately 100 milliseconds before key 80 is powered down.

Those skilled in the art will appreciate that a built-in priority system can be instituted among electronic key units by assigning the key unit having the highest priority to have the shortest response time delay interval. This is because electronic lock 10 will respond to commands from the first correctly received encrypted signals from the valid electronic key 50. This staggered response technique also ensures that there is no cross talk among electronic keys associated with a particular electronic lock. It will also be clear to one skilled in the art that the electronic lock can be equipped with an activation switch, such as a wall-mounted pushbutton or a floor switch built into a floor mat, thereby preventing undesired actuations of the electronic lock when an electronic key comes within sufficiently close proximity of the electronic lock 10. Alternatively, each electronic key can be equipped with a switch which causes a signal to be sent to the electronic lock causing the lock to transmit an unmodulated actuation signal.

Various modifications of the above described embodiment will be apparent to those skilled in the art without departing from the spirit and scope of the present invention. Accordingly, the spirit and scope of the present invention are to be determined only by the following claims.

We claim:

1. A security system for controlling access through an entry point of an area or a system, said entry point having a locked state and one or more unlocked states, each said unlocked state allowing different access through said entry point, said system comprising:

an access controller at said entry point, said access controller comprising:

a memory storing a first code and one or more second codes;

a first electromagnetic wave receiver for receiving electromagnetic energy modulated by codes and producing first signals containing the information in said codes in response thereto, first comparison means adapted to cause said security system to change from said locked state to one of said one or more unlocked states upon proper comparison of the information in codes contained in said first signals with the information in one of said one or more second codes, said one of said one or more unlocked states being a function of said second code that properly compares with the information in the codes contained in said first signals; and a first transmitter for transmitting an unmodulated activation signal followed by a signal modulated by said first code; and one or more electronic keys, each of said one or more electronic keys comprising:

a memory storing said first code and a designated one of said second codes;

a second electromagnetic energy receiver for receiving electromagnetic energy modulated by codes and producing second signals containing the information in said modulating codes in response thereto;

second comparison means for comparing the information in portions of said modulating codes contained in said second signals and portions of said stored first code;

a second transmitter for transmitting a signal modulated by said designated one of said one or more second codes upon the occurrence of proper comparison of the information in portions of modulating codes and portions of said stored code by said second comparison means;

a source of electrical power;

a power switch connected to said memory, said second electromagnetic energy receiver, said second comparison means, said second transmitter and said source of electrical power for selectively coupling electric power from said source of electric power to said memory, said second electromagnetic energy receiver, said second comparison means and said second transmitter; and a passive trigger receiver for receiving said unmodulated activation signal and triggering said power switch to supply electric power to said memory, said second electromagnetic energy receiver, said second comparison means and said second transmitter, upon receipt of said unmodulated activation signal, whereby each of said one or more electronic keys receives said unmodulated activation signal, switches on and transmits a signal modulated by its designated second code after receiving a signal modulated by the first code and properly comparing the information in a portion of the received first code with a portion of the stored first code, said access controller being operative to receive the signal transmitted by said one or more electronic keys, to compare the received designated second code with the stored one or more second codes, and to enter one of said one or more unlocked states upon the occurrence of a proper comparison of the received designated second code and one of the stored one or more second codes, said one of said one or more unlocked states being a function of said designated second code.

2. The security system of claim 1, wherein said unlocked states are hierarchical.

3. The security system of claim 1, wherein said electronic lock further comprises actuable switch means, said switch means producing a signal that causes said first transmitter to transmit said unmodulated activation signal.

4. The security system of claim 1, wherein said first signal and said signal transmitted by said second transmitter are amplitude modulated signals.

5. The security system of claim 1, wherein the electromagnetic energy is radio frequency energy.

6. The security system of claim 1, wherein said first transmitter includes means for periodically transmitting said unmodulated signal followed by said signal modulated by said first code.

7. The security system of claim 1, further comprising:

an actuable switch means; and a mode selection means having first and second modes connected to said first transmitter and said actuable switch means for causing said first transmitter to transmit said unmodulated activation signal followed by said signal modulated by said first code upon actuation of said actuable switch means when in said first mode, and for causing said first transmitter to periodically transmit said unmodulated signal followed by said signal modulated by said first code when in said second mode.

8. The security system of claim 1, further comprising:

a power deactuation means connected to said power switch for receiving electric power from said source of electric power for triggering said power switch to cut off the supply of electric power to said memory, said second electromagnetic energy receiver, said second comparison means and said second transmitter a predetermined period of time after said power switch is triggered to supply electric power.

9. A security system having a locked state and an unlocked state, comprising: an electronic lock comprising:

a memory storing a first code and one or more second codes, each of said one or more second codes comprising a number part and a delay part;

a first electromagnetic wave receiver for receiving electromagnetic energy modulated by codes and producing first signals containing the information in said codes in response thereto, first comparison means adapted to cause said security system to change from said locked state to said unlocked upon proper comparison of the information in codes contained in said first signals with one of said one or more second codes, and a first transmitter for transmitting a signal followed by a signal modulated by said first code; and one or more electronic keys, each of said one or more electronic keys comprising:

a memory storing said first code and a designated one of said second codes;

a second electromagnetic energy receiver for receiving electromagnetic energy modulated by codes and producing second signals containing the information in said modulating codes in response thereto;

second comparison means for comparing the information in portions of said modulating codes contained in said second signals and portions of said stored first code;

a second transmitter for transmitting a signal modulated by said designated one of said one or more second codes upon the occurrence of proper comparison of the information in portions of modulating codes and portions of said stored code by said second comparison means; and a time delay means connected to said memory, said second comparison means and said second transmitter for delaying said second transmitter for a predetermined period of time after the occurrence of proper comparison of the information in portions of modulating codes and portions of said stored first code, said predetermined period of time corresponding to said delay part of said designated one of said one or more second codes, whereby one of said one or more electronic keys transmits a signal modulated by its designated second code after receiving a signal modulated by the first code and properly comparing the information in a portion of the received first code with a portion of the stored first code, said electronic lock being operative to receive the signal transmitted by said electronic key, to compare the received designated second code with the stored one or more second codes, and to enter the unlocked state upon the occurrence of a proper comparison of the received designated second code and one of the stored one or more second codes.

10. The security system of claim 9, wherein said time delay part of each of said one or more second codes is distinct, whereby each of said one or more second codes is distinct, whereby each of said one or more electronic keys corresponding to each of said designated one of said one or more second codes delays its response by different times.

11. The security system of claim 9, wherein said first comparison means and said second comparison means are programmed microprocessors.

12. A security system having a locked state and an unlocked state comprising: an electronic lock comprising:

a memory storing a first code and one or more second codes;

a first electromagnetic wave receiver for receiving electromagnetic energy modulated by codes and producing a first signal containing the information in said codes in response thereto;

a first microprocessor adapted to generate a first random number and to cause said security system to change from said locked state to said unlocked state after deciphering said first signal and upon the occurrence of proper comparison of the information in codes contained in said first signal with one of said one or more second codes; and a first transmitter for transmitting a second signal modulated by a third code encoded according to said first random number and said first code;

one or more electronic keys, each of said one or more electronic keys comprising:

a memory for storing said first code and a designated one of said one or more second codes;

a second electromagnetic wave receiver for receiving electromagnetic energy modulated by codes and producing third signals containing the information in said modulating codes in response thereto;

a second microprocessor for producing a second random number and for deciphering the codes contained in said third signals and comparing the information in portions of said deciphered codes contained in said third signal and portions of said stored first code; and a second transmitter for transmitting a signal modulated by a fourth code encoded according to said second random number and said designated one of said one or more second codes upon the occurrence of proper comparison by said second microprocessor, whereby each of said one or more electronic keys transmits a signal modulated by a fourth code encoded according to said second random number and said designated one of said one or more second codes and properly comparing the information in the received first code with the stored first code, the electronic lock receiving the signal transmitted by said one of said one or more electronic keys, comparing the received distinct fourth code with the stored one or more second codes, and entering the unlocked state upon a proper comparison of the received designated second code and one of said stored one or more second codes.

13. The security system of claim 12, wherein the second random number produced by said electronic key is equal to the first random number generated by said access controller.

14. The security system of claim 12, wherein the access controller further comprises a third transmitter for transmitting an uncoded actuation signal, and each of said one or more electronic keys further comprises a passive receiver and an electrical power switch connected thereto, to receive and respond to the activation signal by causing electrical power to be supplied to the remainder of said electronic key.

15. The security system of claim 12, wherein said third code is encoded by intermixing digits from said first random number and said first code according to a predetermined pattern.

16. The security system of claim 15, wherein said fourth code is encoded by intermixing digits from said second random number and said designated one of said one or more second codes according to a predetermined pattern.

17. The security system of claim 12, wherein the electromagnetic energy is radio frequency energy.

* * * * *